(12) United States Patent
Li et al.

(10) Patent No.: US 8,940,819 B2
(45) Date of Patent: Jan. 27, 2015

(54) ADDITIVE COMPOSITION AND THERMOPLASTIC COMPOSITIONS COMPRISING THE SAME

(71) Applicant: Milliken & Company, Spartanburg, SC (US)

(72) Inventors: Jiang Li, Johns Creek, GA (US); Robbie Willem Hanssen, Boiling Springs, SC (US); Daike Wang, Greer, SC (US); Tamara L. Robertson, Inman, SC (US); Jiannong Xu, Westlake, OH (US)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 13/923,953

(22) Filed: Jun. 21, 2013

(65) Prior Publication Data

US 2013/0289176 A1    Oct. 31, 2013

Related U.S. Application Data

(62) Division of application No. 12/680,345, filed as application No. PCT/US2008/012292 on Oct. 30, 2008, now Pat. No. 8,470,915.

(60) Provisional application No. 60/983,763, filed on Oct. 30, 2007.

(51) Int. Cl.
| | |
|---|---|
| C08K 5/15 | (2006.01) |
| C09D 11/06 | (2006.01) |
| C08K 5/1575 | (2006.01) |
| C08K 5/20 | (2006.01) |
| C08L 23/02 | (2006.01) |
| C08K 5/103 | (2006.01) |

(52) U.S. Cl.
CPC ............... C08K 5/1575 (2013.01); C08K 5/20 (2013.01); C08L 23/02 (2013.01); C08K 5/103 (2013.01)
USPC .......................................... 524/108; 106/504

(58) Field of Classification Search
USPC ........................................................ 524/108
See application file for complete search history.

(56) References Cited

U.S. PATENT DOCUMENTS

| | | |
|---|---|---|
| 3,463,841 A | 8/1969 | Backlund et al. |
| 6,015,854 A | 1/2000 | McCullough, Jr. |
| 6,096,811 A | 8/2000 | Amos et al. |
| 6,251,510 B1* | 6/2001 | Nagaoka et al. ............... 428/218 |
| 6,313,204 B1 | 11/2001 | Kobayashi |
| 6,673,856 B1 | 1/2004 | Mentink |
| 7,157,510 B2 | 1/2007 | Xie et al. |
| 7,262,236 B2 | 8/2007 | Xie et al. |
| 7,365,117 B2 | 4/2008 | Beuke et al. |
| 2002/0028864 A1 | 3/2002 | Kobayashi et al. |
| 2004/0030287 A1 | 2/2004 | Matthijs et al. |
| 2005/0154101 A1 | 7/2005 | Mcenhill et al. |
| 2005/0239926 A1 | 10/2005 | Xie et al. |
| 2006/0122294 A1 | 6/2006 | Beuke et al. |
| 2006/0173108 A1 | 8/2006 | Xu et al. |
| 2006/0183860 A1 | 8/2006 | Mehta et al. |
| 2007/0249850 A1* | 10/2007 | Xie et al. ....................... 549/364 |
| 2007/0254119 A1 | 11/2007 | Lloyd-George |
| 2008/0139718 A1 | 6/2008 | Reyntjens et al. |

FOREIGN PATENT DOCUMENTS

| | | | |
|---|---|---|---|
| EP | 0 319 229 | 6/1989 | |
| EP | 0 476 401 | 3/1992 | |
| EP | 0 524 404 | 1/1993 | |
| EP | 524404 A1 * | 1/1993 | ............... C08K 5/10 |
| EP | 1 127 919 | 8/2001 | |
| JP | 01-118556 A2 | 5/1989 | |
| JP | 8-245843 | 9/1996 | |
| JP | 2010-24428 | 2/2010 | |
| WO | WO 2004/099303 A1 | 11/2004 | |
| WO | WO 2005/030855 A2 | 4/2005 | |
| WO | WO 2006/065649 A1 | 6/2006 | |
| WO | WO 2006/065664 A1 | 6/2006 | |
| WO | WO 2007/024541 A2 | 3/2007 | |

OTHER PUBLICATIONS

Uchama, Hiroshi: "Modified Dibenzylidene Polyol Derivative Transparency Additives for Polyolefins, Their Manufacture, and Low Temperature-Moldable Transparent Polyolefin Compositions" XP002512414 retrieved from STN database accession No. 1996: 731341; abstract; Database CA (Online) Chemical Abstracts Service, Columbus, Ohio, US; Dec. 12, 1996.
International Search Report and the Written Opinion of the International Searching Authority for PCT/US2008/012292.

* cited by examiner

Primary Examiner — Hui Chin
(74) Attorney, Agent, or Firm — Robert M. Lanning

(57) ABSTRACT

A thermoplastic additive composition comprises an acetal compound and at least one co-additive. The acetal compound can be the product of the reaction between an alditol or a $C_1$-substituted alditol and a benzaldehyde. The co-additive can be a fatty acid amide compound, a fatty acid ester compound, and/or a fluoropolymer. A thermoplastic composition comprises a thermoplastic (e.g., one or more polyolefins) and an additive composition as described above.

11 Claims, No Drawings

ADDITIVE COMPOSITION AND THERMOPLASTIC COMPOSITIONS COMPRISING THE SAME

TECHNICAL FIELD OF THE INVENTION

The present invention is directed to additive compositions suitable for use in thermoplastic compositions (e.g., polyolefin compositions) and thermoplastic compositions comprising such additive compositions.

BRIEF SUMMARY OF THE INVENTION

The present invention generally provides additive compositions comprising an acetal compound and one or more co-additives. The acetal compound can be the product of the reaction between an alditol (e.g., an unsubstituted alditol or a $C_1$-substituted alditol) and a benzaldehyde (e.g., an unsubstituted benzaldehyde or a substituted benzaldehyde). Suitable co-additives include, but are not limited to, fatty acid amide compounds, fatty acid ester compounds, and fluoropolymers.

The additive compositions of the invention are suitable for use in many applications, but are believed to be particularly well-suited for use in thermoplastic compositions. In particular, the additive compositions of the invention can be used to improve the optical properties (e.g., haze and/or clarity) of thermoplastic compositions, such as polypropylene-containing and polyethylene-containing thermoplastic compositions. For example, it is believed that the additive compositions of the invention can be used to produce thermoplastic compositions exhibiting improved optical properties relative to thermoplastic compositions containing the same amount of the acetal compound alone (i.e., a thermoplastic composition that contains the same amount of the acetal compound but does not contain the co-additive). Indeed, it is also believed that the additive compositions of the invention are capable of producing thermoplastic compositions exhibiting optical properties that are comparable to the optical properties exhibited by thermoplastic compositions containing higher concentrations of the acetal compound alone (i.e., a thermoplastic composition that contains more of the acetal compound but does not contain the co-additive). In this instance, it is believed that the additive compositions of the invention may be used to reduce the amount of acetal compound required to produce a thermoplastic composition having a desired set of optical properties.

In a first embodiment, the invention provides a thermoplastic composition comprising an acetal compound, a fatty acid amide compound, and at least one thermoplastic polymer. In one specific aspect of this embodiment, the invention provides a thermoplastic composition comprising:

(a) about 1,000 to about 5,000 parts per million (ppm), based on the total weight of the thermoplastic composition, of an acetal compound conforming to the structure of Formula (I):

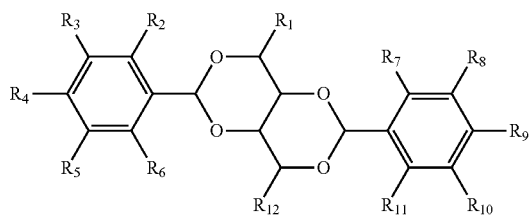

(I)

wherein $R_1$ is selected from the group consisting of hydrogen, alkyl groups, alkenyl groups, hydroxyalkyl groups, alkoxy groups, and alkyl halide groups; wherein $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, and halogens; and wherein $R_{12}$ is a hydroxyalkyl group selected from the group consisting of —$CH_2OH$ and —$CHOHCH_2OH$;

(b) about 100 to about 5,000 ppm, based on the total weight of the thermoplastic composition, of at least one fatty acid amide compound conforming to the structure of one of Formulae (III)-(VII):

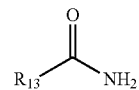
(III)

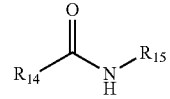
(IV)

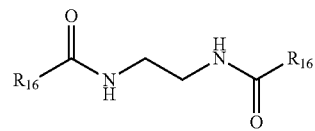
(V)

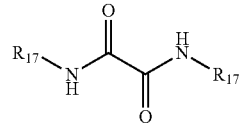
(VI)

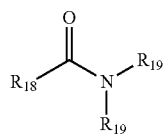
(VII)

wherein $R_{13}$, $R_{14}$, $R_{15}$, $R_{16}$, and $R_{18}$ are independently selected from the group consisting of $C_7$-$C_{27}$ alkyl groups and $C_7$-$C_{27}$ alkenyl groups, $R_{17}$ is selected from the group consisting of $C_8$-$C_{28}$ alkyl groups and $C_8$-$C_{28}$ alkenyl groups, and $R_{19}$ is selected from the group consisting of —$CH_2CH_2OH$ and —$CH_2CH(CH_3)OH$; and (c) at least one thermoplastic polymer selected from the group consisting of polypropylenes and polyethylenes, wherein (i) when the thermoplastic polymer is a polyethylene, the sum of the ppm concentration of the acetal compound and the fatty acid amide is from about 3,000 to about 8,000, and (ii) when the thermoplastic polymer is a polypropylene, $R_1$ is selected from the group consisting of alkyl groups, alkenyl groups, alkoxy groups, and alkyl halide groups, and the sum of the ppm concentration of the acetal compound and the fatty acid amide is from about 2,000 to about 5,000.

In a second embodiment, the invention provides a thermoplastic composition comprising an acetal compound, at least one fluoropolymer, and at least one thermoplastic polymer. In one specific aspect of this embodiment, the invention provides a thermoplastic composition comprising:

(a) about 1,000 to about 5,000 parts per million (ppm), based on the total weight of the thermoplastic composition, of an acetal compound conforming to the structure of Formula (I):

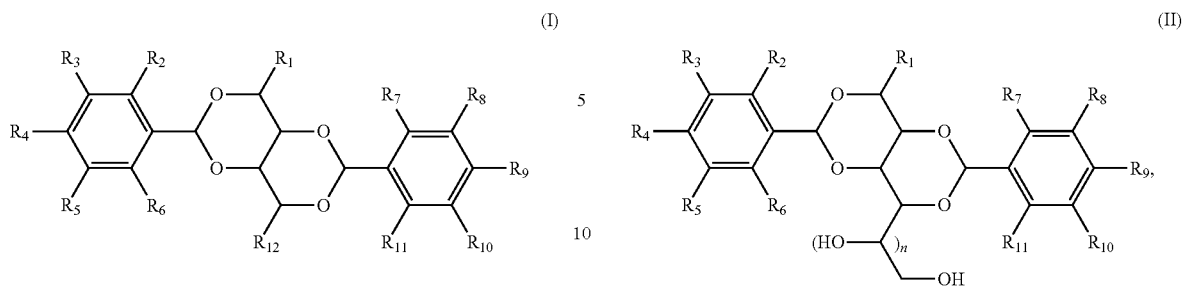

(I)

wherein $R_1$ is selected from the group consisting of alkyl groups, alkenyl groups, alkoxy groups, and alkyl halide groups; wherein $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, and halogens; and wherein $R_{12}$ is a hydroxyalkyl group selected from the group consisting of —CH$_2$OH and —CHOHCH$_2$OH;

(b) about 100 to about 5,000 ppm, based on the total weight of the thermoplastic composition, of at least one fluoropolymer conforming to the structure of Formula (VIII) below:

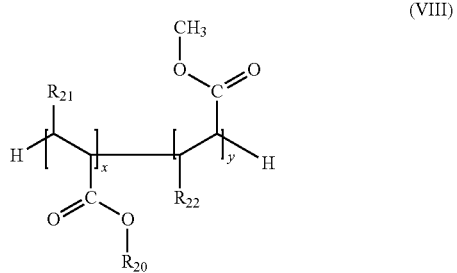

(VIII)

wherein $R_{20}$ is selected from the group consisting of —CF$_2$CF$_2$CF$_2$CF$_3$, —CF$_2$CF$_2$CF$_2$CF$_2$CF$_2$CF$_3$, —CF$_2$CF$_2$CF$_2$CF$_2$CF$_2$CF$_2$CF$_2$CF$_3$, $R_{21}$ and $R_{22}$ are independently selected from the group consisting of hydrogen and methyl, x is an integer from about 15 to about 10,000, y is an integer from 0 to about 10,000, and the sum of m and n is from about 30 to about 10,000; and (c) at least one thermoplastic polymer selected from the group consisting of polypropylenes, polyethylenes, and mixtures thereof.

In a third embodiment, the invention provides an additive composition comprising an acetal compound and a fatty acid ester compound. The acetal compound can, in certain embodiments, be the product of the reaction between a C$_1$-substituted alditol and a benzaldehyde. In certain embodiments, the fatty acid ester compound can be the product of the reaction between a fatty acid (e.g., a C$_{10}$-C$_{22}$ fatty acid) and a compound selected from the group consisting of glycerol, diglycerol, and combination thereof. In one specific aspect of this embodiment, the invention provides a thermoplastic additive composition comprising:

(a) an acetal compound conforming to the structure of Formula (II)

(II)

wherein n is 0, 1, or 2; $R_1$ is selected from the group consisting alkyl groups, alkenyl groups, alkoxy groups, and alkyl halide groups; and $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkenyl groups, alkoxy groups, carboxyl groups, halogens, and phenyl groups; and (b) a fatty acid ester compound.

In certain embodiments, the invention provides thermoplastic compositions comprising a thermoplastic (e.g., one or more polyolefins) and an additive composition as described above. In certain embodiments, the thermoplastic can be polypropylene.

DETAILED DESCRIPTION OF THE INVENTION

As noted above, the present invention generally provides additive compositions comprising an acetal compound and one or more co-additives, as well as thermoplastic compositions containing such additive compositions. The acetal compound can be the product of the reaction between an alditol (e.g., an unsubstituted alditol or a C$_1$-substitued alditol) and a benzaldehyde (e.g., an unsubstituted benzaldehyde or a substituted benzaldehyde). The co-additive can be a fatty acid amide compound, a fatty acid ester compound, or a fluoropolymer.

The additive compositions of the invention can be produced using any suitable method. For example, the additive compositions can be produced by simple mixing of the individual components (e.g., acetal compound and co-additive). The additive compositions can also be produced by mixing the individual components under high shear or high intensity mixing conditions. The additive compositions of the invention can be provided in any suitable form. For example, the additive compositions can be provided in the form of a powder (e.g., free-flowing powder), flake, pellet, prill, tablet, agglomerate, liquid suspension, and the like.

The Acetal Compound

The acetal compounds suitable for use in the additive compositions and thermoplastic compositions of the invention can be any suitable acetal compounds. For example, the acetal compound can be the product of the reaction between an alditol and a benzaldehyde. The alditol compound can be an unsubstituted alditol (e.g., xylitol or sorbitol) or a substituted alditol (e.g., 1,2,3-trideoxynonitol or 1,2,3-trideoxynon-1-enitol). The benzaldehyde compound can be an unsubstituted benzaldehyde or a substituted benzaldehyde (e.g., 3,4-dimethylbenzaldehyde or 4-propylbenzaldehyde). Furthermore, the acetal compound produced by the reaction can be a monoacetal, di-acetal, or tri-acetal compound (i.e., a compound containing one, two, or three acetal groups, respectively).

In certain embodiments, the acetal compound can be an acetal compound conforming to the structure of Formula (I):

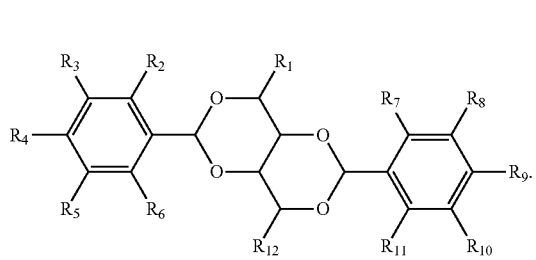

(I)

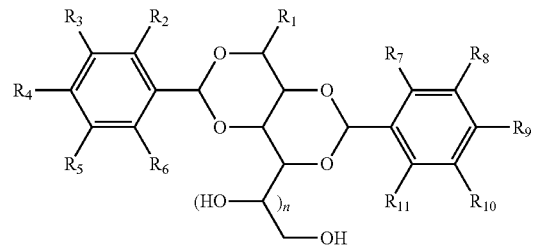

(II)

In the structure of Formula (I), $R_1$ is selected from the group consisting of hydrogen, alkyl groups, alkenyl groups, hydroxyalkyl groups, alkoxy groups, alkyl halide groups, and derivatives thereof. $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, carboxyl groups, and halogens. $R_{12}$ is a hydroxyalkyl group selected from the group consisting of —CH$_2$OH and —CHOHCH$_2$OH.

In certain embodiments of the invention, $R_1$ is selected from the group consisting of alkyl groups and alkenyl groups, $R_2$, $R_3$, $R_5$, $R_6$, $R_7$, $R_8$, $R_{10}$, and $R_{11}$ are each hydrogen, $R_{12}$ is —CHOHCH$_2$OH, and $R_4$ and $R_9$ are each alkyl groups. In a more specific embodiment, $R_1$ is an n-propyl group, $R_2$, $R_3$, $R_5$, $R_6$, $R_7$, $R_8$, $R_{10}$, and $R_{11}$ are each hydrogen, $R_{12}$ is —CHOHCH$_2$OH, and $R_4$ and $R_9$ are each n-propyl groups.

In other embodiments of the invention, $R_1$ is hydrogen, $R_2$, $R_5$, $R_6$, $R_7$, $R_8$, and $R_{11}$ are each hydrogen, $R_3$, $R_4$, $R_9$, and $R_{10}$ are each alkyl groups, and $R_{12}$ is —CHOHCH$_2$OH. In a more specific embodiment, $R_1$ is hydrogen, $R_2$, $R_5$, $R_6$, $R_7$, $R_8$, and $R_{11}$ are each hydrogen, $R_3$, $R_4$, $R_9$, and $R_{10}$ are each methyl groups, and $R_{12}$ is —CHOHCH$_2$OH.

In certain embodiments of the invention, the acetal compound can be the product of the reaction between a $C_1$-substituted alditol and a benzaldehyde. As utilized herein, the term "$C_1$-substituted alditol" is used to refer to a compound in which a terminal carbon of an alditol (e.g., a terminal carbon atom which typically is substituted with a single hydroxyl group) is substituted with an additional group. The $C_1$-substiuted alditol can be substituted with any suitable group. In certain embodiments, the $C_1$-substituted alditol can be substituted with a group selected from the group consisting of alkyl groups, alkenyl groups, alkoxy groups, hydroxy alkyl groups, alkyl halide groups, and derivatives thereof. The benzaldehyde can be any suitable benzaldehyde, including both unsubstituted and substituted benzaldehydes. In certain embodiments, the benzaldehyde can be substituted with one or more groups selected from the group consisting of alkyl groups, alkenyl groups, alkoxy groups, carboxyl groups, halogens, and aryl groups (e.g., phenyl groups). Suitable acetal compounds derived from the reaction between a $C_1$-substituted alditol and a benzaldehyde include, but are not limited to, the acetal compounds disclosed in U.S. Pat. Nos. 7,157,510 and 7,262,236, each of which is hereby incorporated by reference in its entirety.

Thus, in certain embodiments, the acetal compound can be a di-acetal compound conforming to the structure of Formula (II) below In Formula (II), n is 0, 1, or 2, and $R_1$ is selected from the group consisting alkyl groups, alkenyl groups, alkoxy groups, hydroxy alkyl groups, alkyl halide groups, and derivatives thereof. $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkenyl groups, alkoxy groups, carboxyl groups, halogens, and phenyl groups. In certain embodiments, n is 1, $R_1$ is an alkyl group (e.g., an n-propyl group), $R_4$ and $R_9$ are alkyl groups (e.g., n-propyl groups), and $R_2$, $R_4$, $R_5$, $R_6$, $R_7$, $R_9$, $R_{10}$ and $R_{11}$ are each hydrogen.

In those embodiments of the invention providing a thermoplastic additive composition (e.g., a thermoplastic additive composition comprising an acetal compound and a co-additive), the acetal compound can be present in the additive composition in any suitable amount. In certain embodiments, the acetal compound can comprise about 50 wt. % or more, about 55 wt. % or more, about 60 wt. % or more, about 65 wt. % or more, about 70 wt. % or more, about 75 wt. % or more, or about 80 wt. % or more of the additive composition, based on the total weight of the acetal compound and the co-additive present in the additive composition. In certain embodiments, the acetal compound typically comprises about 95 wt. % or less or about 90 wt. % or less of the additive composition, based on the total weight of the acetal compound and the co-additive present in the additive composition. In certain embodiments, the acetal compound can comprise about 60 to about 90 wt. %, about 65 to about 90 wt. %, or about 65 to about 85 wt. % of the additive composition, based on the total weight of the acetal compound and the co-additive present in the additive composition.

In those embodiments of the invention providing a thermoplastic composition, the acetal compound can be present in the thermoplastic composition in any suitable amount. In certain embodiments, the acetal compound can be present in the thermoplastic composition in an amount of about 50 ppm or more, about 100 ppm or more, about 250 ppm or more, about 500 ppm or more, about 1,000 ppm or more, about 1,500 ppm or more, or about 2,000 ppm or more, based on the total weight of the thermoplastic composition. In certain embodiments, the acetal compound can be present in the thermoplastic composition in an amount of about 30,000 ppm or less, about 10,000 ppm or less, about 9,000 ppm or less, about 8,000 ppm or less, or about 6,000 ppm or less, based on the total weight of the thermoplastic composition. In certain embodiments, the acetal compound can be present in the thermoplastic composition in an amount of about 1,000 to about 10,000 ppm (e.g., about 1,000 to about 5,000 ppm or about 1,000 to about 3,500 ppm), about 1,500 to about 8,000 ppm, or about 2,000 to about 5,000 ppm, based on the total weight of the thermoplastic composition.

The Co-additive

As noted above, co-additives suitable for use in the compositions of the invention include fatty acid amide compounds, fatty acid ester compounds, and fluoropolymers.

The co-additive can be present in the compositions of the invention in any suitable amount. In those embodiments of the invention providing a thermoplastic additive composition (e.g., a thermoplastic additive composition comprising an acetal compound and a co-additive), the co-additive can be present in the additive composition in any suitable amount. In certain embodiments, the co-additive can comprise about 5 wt. % or more or about 10 wt. % or more of the additive composition, based on the total weight of the acetal compound and the co-additive present in the additive composition. In certain embodiments, the co-additive can comprise about 50 wt. % or less, about 40 wt. % or less, about 30 wt. % or less, about 25 wt. % or less, or about 20 wt. % or less of the additive composition, based on the total weight of the acetal compound and the co-additive present in the additive composition. In certain embodiments, the co-additive can comprise about 10 to about 40 wt. %, about 10 to about 35 wt. %, or about 15 to about 35 wt. % of the additive composition, based on the total weight of the acetal compound and the co-additive present in the additive composition.

In those embodiments of the invention providing a thermoplastic composition, the co-additive can be present in the thermoplastic composition in any suitable amount. For example, the co-additive can be present in the thermoplastic composition in an amount of about 100 ppm or more, about 200 ppm or more, or about 400 ppm or more, based on the total weight of the thermoplastic composition. The co-additive can also be present in the thermoplastic composition in an amount of about 10,000 ppm or less, about 5,000 ppm or less, about 4,000 ppm or less, or about 3,000 ppm or less, based on the total weight of the thermoplastic composition. In certain more specific aspects of such embodiments, the co-additive can be present in the thermoplastic composition in an amount of about 100 to about 5,000 ppm (e.g., about 100 to about 1,500 ppm), about 200 to about 4,000 (e.g., about 200 to about 1,000 ppm or about 250 to about 750 ppm), or about 400 to about 3,000 ppm (e.g., about 400 to about 600 ppm), based on the total weight of the thermoplastic composition.

As will be understood by those of ordinary skill in the art, the amount of the acetal compound and the co-additive present in the thermoplastic additive compositions of the invention and the thermoplastic compositions of the invention may depend upon several factors. For example, the amounts of these components may vary based on the composition of the target thermoplastic polymer (i.e., the thermoplastic polymer to which the additive composition will be added), the composition of the particular acetal compound and co-additive present in the additive composition, the level at which the additive composition will be added to the target thermoplastic polymer, and the desired optical properties for the target thermoplastic polymer.

Fatty Acid Amide Compounds

In certain embodiments of the compositions provided by the invention, the co-additive can be a fatty acid amide compound. The fatty acid amide compound present in the compositions of the invention can be any suitable amide compound derived from the reaction between a fatty acid and ammonia or an amine-containing compound (e.g., a compound containing a primary amine group or a secondary amine group). The fatty acid can be any suitable fatty acid, such as a saturated or unsaturated $C_8$-$C_{28}$ fatty acid or a saturated or unsaturated $C_{12}$-$C_{28}$ fatty acid. In certain embodiments, the fatty acid can be a fatty acid selected from the group consisting of erucic acid (i.e., cis-13-docosenoic acid), oleic acid (i.e., cis-9-octadecenoic acid), stearic acid (octadecanoic acid), behenic acid (i.e., docosanoic acid), arachic acid (i.e., arachidinic acid or eicosanoic acid), palmitic acid (i.e., hexadecanoic acid), and mixtures or combinations thereof. The amine-containing compound can be any suitable amine-containing compound, such as fatty amines (e.g., stearylamine or oleylamine), ethylenediamine, 2,2'-iminodiethanol, and 1,1'-iminodipropan-2-ol.

In certain embodiments of the compositions of the invention, the fatty acid amide compound can be a fatty acid amide compound conforming to the structure of one of Formulae (III)-(VII):

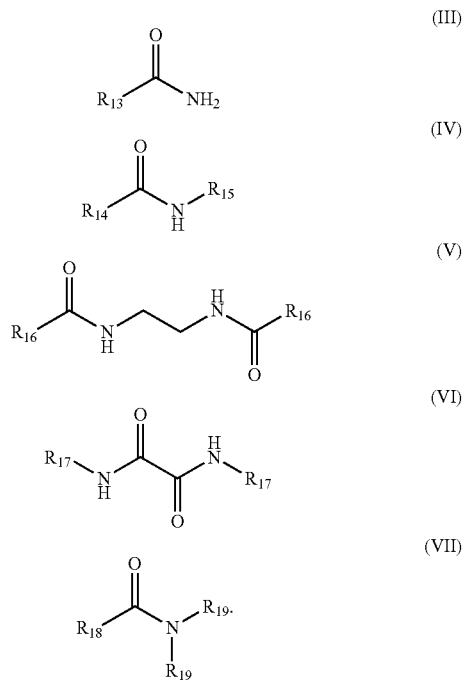

In each of the structures of Formulae (III)-(VII), $R_{13}$, $R_{14}$, $R_{15}$, $R_{16}$, and $R_{18}$ are independently selected from the group consisting of $C_7$-$C_{27}$ alkyl groups and $C_7$-$C_{27}$ alkenyl groups, $R_{17}$ is selected from the group consisting of $C_8$-$C_{28}$ alkyl groups and $C_8$-$C_{28}$ alkenyl groups, and $R_{19}$ is selected from the group consisting of —$CH_2CH_2OH$ and —$CH_2CH(CH_3)$ OH. In certain embodiments, $R_{13}$, $R_{14}$, $R_{15}$, $R_{16}$, and $R_{18}$ are independently selected from the group consisting of $C_{11}$-$C_{27}$ alkyl groups and $C_{11}$-$C_{27}$ alkenyl groups, and $R_{17}$ is selected from the group consisting of $C_{12}$-$C_{28}$ alkyl groups and $C_{12}$-$C_{28}$ alkenyl groups.

In certain embodiments, the fatty acid amide compound can be a compound conforming to the structure of Formula (III) where $R_{13}$ is selected from the group consisting of —$CH_2(CH_2)_{10}CH$=$CH(CH_2)_7CH_3$, —$CH_2(CH_2)_6$ $CH$=$CH(CH_2)_7CH_3$, —$CH_2(CH_2)_{15}CH_3$, —$CH_2(CH_2)_{19}$ $CH_3$, and —$CH_2(CH_2)_{17}CH_3$. The composition can also contain a mixture of two or more such fatty acid amide compounds. In certain embodiments, the fatty acid amide compound can be a compound conforming to the structure of Formula (IV) where $R_{14}$ is —$CH_2(CH_2)_{10}CH$=$CH(CH_2)_7$ $CH_3$ and $R_{15}$ is —$CH_2(CH_2)_{15}CH_3$ or where $R_{14}$ is —$CH_2$ $(CH_2)_6CH$=$CH(CH_2)_7CH_3$ and $R_{15}$ is —$CH_2(CH_2)_{13}CH_3$. In certain embodiments, the fatty acid amide compound can be a compound conforming to the structure of Formula (V) where $R_{16}$ is —$CH_2(CH_2)_{16}CH_3$ or —$CH_2(CH_2)_6CH$=$CH$ $(CH_2)_7CH_3$.

In those embodiments of the invention providing a thermoplastic composition, the fatty acid amide compound can be present in the thermoplastic composition in any suitable amount. For example, the fatty acid amide compound can be present in the thermoplastic composition in an amount of about 100 ppm or more, about 200 ppm or more, about 300 ppm or more, or about 400 ppm or more, based on the total weight of the thermoplastic composition. The fatty acid amide compound can also be present in the thermoplastic composition in an amount of about 10,000 ppm or less, about 5,000 ppm or less, about 4,000 ppm or less, or about 3,000 ppm or less, about 2,000 ppm or less, or about 1,000 ppm or less, based on the total weight of the thermoplastic composition. In certain more specific aspects of such embodiments, the fatty acid amide compound can be present in the thermoplastic composition in an amount of about 100 to about 5,000 ppm (e.g., about 100 to about 1,500 ppm), about 200 to about 4,000 (e.g., about 200 to about 1,000 ppm or about 250 to about 750 ppm), or about 400 to about 3,000 ppm (e.g., about 400 to about 600 ppm), based on the total weight of the thermoplastic composition.

In one aspect of the thermoplastic compositions comprising a fatty acid amide compound as a co-additive, the thermoplastic polymer can be a polyethylene (such as those described below), and the sum of the ppm concentration of the acetal compound and the fatty acid amide can be from about 3,000 to about 8,000. In another aspect of the thermoplastic compositions comprising a fatty acid amide compound as a co-additive, the thermoplastic polymer can be a polypropylene (such as those described below), $R_1$ can be selected from the group consisting of alkyl groups, alkenyl groups, alkoxy groups, and alkyl halide groups, and the sum of the ppm concentration of the acetal compound and the fatty acid amide can be from about 2,000 to about 5,000.

Fluoropolymers

In certain embodiments of the compositions provided by the invention, the co-additive can be a fluoropolymer. Fluoropolymers suitable for use in the compositions of the invention include any fluoropolymer suitable for addition to a thermoplastic composition, such as fluorinated acrylic polymers and copolymers. Such fluoropolymers include the polymers derived from the free radical polymerization of fluorinated acrylic monomers (e.g., fluorinated acrylic acid or fluorinated methacrylic acid) and the copolymers derived from the free radical polymerization of acrylic monomers (e.g., acrylic acid or methacrylic acid) and fluorinated acrylic monomers (e.g., fluorinated acrylic acid or fluorinated methacrylic acid).

In certain embodiments of the compositions according to the invention, the fluoropolymer can be a fluoropolymer conforming to the structure of Formula (VIII) below:

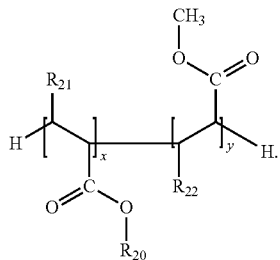

(VIII)

In the structure of Formula (VIII), $R_{20}$ is selected from the group consisting of $-CF_2CF_2CF_2CF_3$, $-CF_2CF_2CF_2CF_2CF_3$, and $-CF_2CF_2CF_2CF_2CF_2CF_2CF_2CF_3$. $R_{21}$ and $R_{22}$ are independently selected from the group consisting of hydrogen and methyl, x is an integer from about 15 to about 10,000 (e.g., about 20 to about 10,000 or about 50 to about 10,000), y is an integer from 0 to about 10,000, and the sum of m and n is from about 30 to about 10,000 (e.g., about 50 to about 10,000). In certain embodiments, $R_{21}$ and $R_{22}$ can each be methyl.

As will be understood by those of ordinary skill in the art, the structure of Formula (VIII) is intended to be a shorthand method of representing the polymers and/or copolymers produced by the free radical polymerization of the monomers. For those polymers containing repeating units derived from both fluorinated monomers and non-fluorinated monomers (e.g., copolymers derived from fluorinated methacrylic acid and methacrylic acid), the structure of Formula (VIII) is not intended to require that the resulting polymer contain two separate blocks of repeating units derived from the two different monomers. Rather, as will be understood by those of ordinary skill in the art, the free radical polymerization of such a mixture of monomers will produce a copolymer containing a random arrangement of repeating units along the polymer chain. The structure of Formula (VIII) is intended to encompass such a copolymer. Thus, the structure of Formula (VIII) is merely intended to act as a shorthand representation of such polymers and provide a facile means to specify the number of repeating units present in the polymer chain.

In those embodiments of the invention providing a thermoplastic composition, the fluoropolymer can be present in the thermoplastic composition in any suitable amount. For example, the fluoropolymer can be present in the thermoplastic composition in an amount of about 100 ppm or more, about 200 ppm or more, about 300 ppm or more, or about 400 ppm or more, based on the total weight of the thermoplastic composition. The fluoropolymer can also be present in the thermoplastic composition in an amount of about 10,000 ppm or less, about 5,000 ppm or less, about 4,000 ppm or less, or about 3,000 ppm or less, about 2,000 ppm or less, or about 1,000 ppm or less, based on the total weight of the thermoplastic composition. In certain more specific aspects of such embodiments, the fluoropolymer can be present in the thermoplastic composition in an amount of about 100 to about 5,000 ppm (e.g., about 100 to about 1,500 ppm), about 200 to about 4,000 (e.g., about 200 to about 1,000 ppm or about 250 to about 750 ppm), or about 400 to about 3,000 ppm (e.g., about 400 to about 600 ppm), based on the total weight of the thermoplastic composition.

Fatty Acid Ester Compounds

In certain embodiments of the compositions provided by the invention, the co-additive can be a fatty acid ester compound. The fatty acid ester compound present in the compositions of the invention can be any suitable ester compound derived from the reaction between a fatty acid and a hydroxyl-containing compound. In certain embodiments, the fatty acid ester compound can be the product of the reaction between a fatty acid and a compound selected from the group consisting of glycerol, diglycerol, and combinations thereof. The fatty acid can be any suitable fatty acid. In certain embodiments, the fatty acid is a $C_{10}$-$C_{22}$ fatty acid (e.g., a $C_{12}$-$C_{20}$ fatty acid, a $C_{12}$-$C_{18}$ fatty acid, or a $C_{12}$-$C_{16}$ fatty acid). In certain embodiments, the fatty acid ester compound comprises a compound selected from the group consisting of diglycerol monolaurate, diglycerol monomyristate, diglycerol monostearate, and combinations thereof, which compounds are ester compounds produced by the reaction of a fatty acid (lauric acid, myristic acid, or stearic acid, respectively) with diglycerol. Suitable fatty acid ester compounds and methods for synthesizing the same are described in Japanese Patent No. 3 463 841, which patent is hereby incorporated by reference in its entirety.

As will be understood by those of skill in the art, fatty acid ester compounds derived from the reaction between a fatty acid and glycerol or diglycerol (as described above) can comprise multiple ester moieties due to the presence of more than one hydroxyl group on the glycerol or diglycerol used to produce the fatty acid ester compound. While not wishing to be bound to any particular theory, it is believed that, for the additive compositions described herein, fatty acid ester compounds comprising relatively high amounts of the monoester may provider greater benefits (e.g., thermoplastic compositions having better optical properties) relative to fatty ester compounds containing higher amounts of the compounds containing multiple ester moieties. Thus, in certain embodiments, the fatty acid ester compound comprises about 50 wt. % or more of the monoester (i.e., a compound containing a single ester moiety resulting from the reaction between the fatty acid and the glycerol or diglycerol), based on the total weight of the fatty acid ester compound present in the additive composition. In certain embodiments, the fatty ester compound can comprise about 60 wt. % or more, about 70 wt. % or more, about 80 wt. % or more, about 85 wt. % or more, or about 90 wt. % or more of the monoester, based on the total weight of the fatty acid ester compound present in the additive composition.

In those embodiments of the invention providing a thermoplastic additive composition, the fatty acid ester compound can be present in the additive composition in any suitable amount. In certain embodiments, the fatty acid ester compound comprises about 5 wt. % or more or about 10 wt. % or more of the additive composition, based on the total weight of the acetal compound and fatty acid ester compound present in the additive composition. In certain embodiments, the fatty acid ester compound comprises about 50 wt. % or less, about 40 wt. % or less, about 30 wt. % or less, about 25 wt. % or less, or about 20 wt. % or less of the additive composition, based on the total weight of the acetal compound and fatty acid ester compound present in the additive composition. In certain embodiments, the fatty acid ester compound comprises about 10 to about 40 wt. %, about 10 to about 35 wt. %, or about 15 to about 35 wt. % of the additive composition, based on the total weight of the acetal compound and fatty acid ester compound present in the additive composition.

In those embodiments of the invention providing a thermoplastic composition, the fatty acid ester compound can be present in the thermoplastic composition in any suitable amount. In certain embodiments, the fatty acid ester compound can be present in the thermoplastic composition in an amount of about 100 ppm or more, about 200 ppm or more, or about 400 ppm or more, based on the total weight of the thermoplastic composition. In certain embodiments, the fatty acid ester compound can be present in the thermoplastic composition in an amount of about 10,000 ppm or less, about 5,000 ppm or less, about 4,000 ppm or less, or about 3,000 ppm or less, based on the total weight of the thermoplastic composition. In certain embodiments, the fatty acid ester compound can be present in the thermoplastic composition in an amount of about 100 to about 5,000 ppm, about 200 to about 4,000, or about 400 to about 3,000 ppm, based on the total weight of the thermoplastic composition.

The Thermoplastic Polymer

As noted throughout the present specification, the invention provides thermoplastic compositions in addition to the thermoplastic additive compositions. In the broadest terms, the thermoplastic compositions of the invention are combinations of a thermoplastic polymer, an acetal compound, and a co-additive as described above.

The thermoplastic polymer present in the thermoplastic compositions of the invention can be any suitable thermoplastic polymer. Suitable thermoplastic polymers include, but are not limited to, polyolefins, polyesters (e.g., polyethylene terephthalate), polyamides, polystyrenes, or polyketones (e.g., polyketones having carbonyl groups in their backbone). In certain embodiments, the thermoplastic polymer can be a polyolefin selected from the group consisting of polymers and copolymers of aliphatic mono-olefins containing from 2 to 6 carbon atoms. These polymers and copolymers can have an average molecular weight of from about 10,000 to about 2,000,000, or about 30,000 to about 300,000. In certain embodiments, the thermoplastic polymer is a polyolefin selected from the group consisting of polyethylenes (e.g., linear low density polyethylene, low density polyethylene, and high density polyethylene), polypropylenes, crystalline ethylene/propylene copolymers (random or block), poly(1-butene) and polymethylpentene. In certain embodiments, the thermoplastic polymer is a polyolefin selected from the group consisting of polypropylenes, polyethylenes, and mixtures thereof.

The thermoplastic composition of the invention can be produced by any suitable method. For example, the thermoplastic composition can be produced by simple mixing of an additive composition (as described above) with the thermoplastic polymer(s) or by simple mixing of the individual components of the thermoplastic composition (e.g., acetal compound, co-additive, and thermoplastic polymer). The thermoplastic compositions can also be produced by mixing the individual components under high shear or high intensity mixing conditions. The thermoplastic compositions of the invention can be provided in any form suitable for use in further processing to produce an article from the thermoplastic composition. For example, the thermoplastic compositions can be provided in the form of a powder (e.g., free-flowing powder), flake, pellet, prill, tablet, agglomerate, and the like.

The thermoplastic compositions of the invention are believed to be useful in producing thermoplastic articles. The thermoplastic compositions of the invention can be formed into the desired thermoplastic article by any suitable technique, such as injection molding, injection rotational molding, blow molding (e.g., injection blow molding or injection stretch blow molding), extrusion (e.g., sheet extrusion, film extrusion, cast film extrusion, or foam extrusion), extrusion blow molding, thermoforming, rotomolding, film blowing (blown film), film casting (cast film), and the like.

The thermoplastic compositions of the invention can be used to produce any suitable article or product. Suitable products include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

Optional Components

The compositions of the invention can, in certain embodiments, comprise one or more components in addition to the acetal compounds, co-additives, and, if present, thermoplastic polymers described above. Suitable additional additives include, but are not limited to, antioxidants, acid scavengers, and combinations thereof.

While not wishing to be bound to any particular theory, the additive compositions described above are believed to be capable of producing thermoplastic compositions (e.g., polypropylene compositions) having improved optical properties (e.g., lower haze values) relative to known additive compositions. For example, it is believed that, at lower loading levels of the acetal compound in the thermoplastic composition, the above-described additive compositions are capable of producing thermoplastic compositions (e.g., polypropylene compositions) having the same or better optical properties (e.g., haze values) than thermoplastic compositions containing higher amounts of the acetal compound. Thus, the additive compositions described above may be used to produce thermoplastic compositions having the desired optical properties while using lower amounts of the acetal compound.

EXAMPLE 1

This example demonstrates the production of thermoplastic compositions according to the invention and some of the physical properties exhibited by thermoplastic articles made from such compositions. Eight polypropylene random copolymer compositions (Samples 1A-1F and Comparative Samples 1 and 2) were compounded in accordance with the general formulations set forth in Tables 1 and 2 below and the general procedure described below.

TABLE 1

General formulation for Samples 1A-1C.

| Component | Amount |
| --- | --- |
| Polypropylene random copolymer | 995.2 g |
| Primary antioxidant (Irganox ® 1010) | 0.5 g |
| Secondary antioxidant (Irgafos ® 168) | 1.0 g |
| Acid scavenger (calcium stearate) | 0.8 g |
| Acetal compound | 2.0 g |
| Co-additive | 0.5 g |

TABLE 2

General formulation for Samples 1D-1F.

| Component | Amount |
| --- | --- |
| Polypropylene random copolymer | 994.2 g |
| Primary antioxidant (Irganox ® 1010) | 0.5 g |
| Secondary antioxidant (Irgafos ® 168) | 1.0 g |
| Acid scavenger (calcium stearate) | 0.8 g |
| Acetal compound | 3.0 g |
| Co-additive | 0.5 g |

The acetal compound used in each of the compositions (i.e., Samples 1A-1F and Comparative Samples 1 and 2) was an acetal compound conforming to the structure of Formula (I) in which $R_1$ is an n-propyl group, $R_2$, $R_3$, $R_5$, $R_6$, $R_7$, $R_8$, $R_{10}$, and $R_{11}$ are each hydrogen, $R_{12}$ is —CHOHCH$_2$OH, and $R_4$ and $R_9$ are each n-propyl groups. The co-additive used in Samples 1A and 1D was bisoctadecyl oxalamide (N,N'-diethylethanediamide), which is a fatty acid amide compound conforming to the structure of Formula (VI) in which $R_{17}$ is —CH$_2$(CH$_2$)$_{16}$CH$_3$. The co-additive used in Samples 1B and 1E was oleamide (cis-9-octadecenamide), which is a fatty acid amide compound conforming to the structure of Formula (III) in which $R_{13}$ is —CH$_2$(CH$_2$)$_6$CH═CH(CH$_2$)$_7$CH$_3$. The co-additive used in Samples 1C and 1F was ethylene bis-stearamide, which is a fatty acid amide compound conforming to the structure of Formula (V) in which $R_{16}$ is —CH$_2$(CH$_2$)$_{15}$CH$_3$.

The composition for Comparative Sample 1 was similar to the composition for Samples 1A-1C, except that the composition did not contain a co-additive and the amount of polypropylene random copolymer was increased to 995.7 g in order to yield a one kilogram batch of the composition. The composition for Comparative Sample 2 was similar to the composition for Samples 1D-1F, except that the composition did not contain a co-additive and the amount of polypropylene random copolymer was increased to 994.7 g in order to yield a one kilogram batch of the composition.

All eight of the polypropylene random copolymer compositions were compounded by blending the components in a high intensity mixer. The polypropylene random copolymer compositions were then melt compounded on a twin-screw extruder. The extrudate (in the form of a strand) for each polypropylene random copolymer composition was cooled in a water bath and subsequently pelletized.

The pelletized polypropylene random copolymer compositions were then used to form plaques by injection molding the compositions on an injection molder. The resulting plaques were then tested in accordance with ASTM Standard D1003-92 using a BYK-Gardner Haze-Gard Plus to determine the percent haze for each of the polypropylene random copolymer compositions. The results for each of these measurements are set forth in Table 3 below.

TABLE 3

Haze measurements for Samples 1A-1F and Comparative Samples 1 and 2.

| Sample | Haze (%) |
| --- | --- |
| Comparative Sample 1 | 12.1 |
| Sample 1A | 10.2 |
| Sample 1B | 9.47 |
| Sample 1C | 9.33 |
| Comparative Sample 2 | 9.59 |
| Sample 1D | 8.23 |
| Sample 1E | 8.14 |
| Sample 1F | 8.15 |

As can be seen from the results set forth in Table 3, the thermoplastic polymer compositions according to the invention (i.e., Samples 1A-1F) each exhibited lower haze values than the comparative samples (i.e., Comparative Samples 1 and 2) containing the same concentration of the acetal compound. These results suggest that the additive compositions of the invention can be used to produce thermoplastic compositions having improved optical properties (e.g., haze values) relative to thermoplastic compositions containing the same amount of acetal compound or can be used to reduce the amount of acetal compound required to produce a thermoplastic compositions exhibiting the desired optical properties.

EXAMPLE 2

This example demonstrates the production of thermoplastic compositions according to the invention and some of the physical properties exhibited by thermoplastic articles made from such compositions. Five polypropylene random copolymer compositions (Samples 2A-2C and Comparative Samples 3 and 4) were compounded in accordance with the general formulations set forth in Table 4 below and the general procedure described below.

TABLE 4

General formulation for Samples 2A-2C, Comparative Sample 3 ("C.S. 3"), and Comparative Sample 4 ("C.S. 4").

| Component | Amount per Sample (g) | | | | |
|---|---|---|---|---|---|
|  | 2A | 2B | 2C | C.S. 3 | C.S. 4 |
| Polypropylene random copolymer | 994.3 | 994.0 | 993.5 | 994.45 | 994.5 |
| Primary antioxidant (Irganox ® 1010) | 0.5 | 0.5 | 0.5 | 0.5 | 0.5 |
| Secondary antioxidant (Irgafos ® 168) | 1.0 | 1.0 | 1.0 | 1.0 | 1.0 |
| Acid scavenger (calcium stearate) | 1.0 | 1.0 | 1.0 | 1.0 | 1.0 |
| Acetal compound | 3.0 | 3.0 | 3.0 | 3.0 | 3.0 |
| Co-additive | 0.2 | 0.5 | 1.0 | 0.05 | 0 |

The acetal compound used in each of the compositions (i.e., Samples 2A-2D and Comparative Sample 3) was an acetal compound conforming to the structure of Formula (I) in which $R_1$ is an n-propyl group, $R_2$, $R_3$, $R_5$, $R_6$, $R_7$, $R_8$, $R_{10}$, and $R_{11}$ are each hydrogen, $R_{12}$ is —CHOHCH$_2$OH, and $R_4$ and $R_9$ are each n-propyl groups. Samples 2A, 2B, and 2C, and Comparative Sample 3 contained a fluoropolymer co-additive conforming to the structure of Formula (VIII) where $R_{20}$ is —CF$_2$CF$_2$CF$_2$CF$_2$CF$_2$CF$_2$CF$_2$CF$_3$, $R_{21}$ and $R_{22}$ are both methyl, x is approximately 20, and y is approximately 30, which is a fluoropolymer that is a random copolymer derived from the polymerization of fluorinated methacrylic acid and methacrylic acid.

All five of the polypropylene random copolymer compositions were compounded by blending the components in a high intensity mixer. The polypropylene random copolymer compositions were then melt compounded on a twin-screw extruder. The extrudate (in the form of a strand) for each polypropylene random copolymer composition was cooled in a water bath and subsequently pelletized.

The pelletized polypropylene random copolymer compositions were then used to form plaques by injection molding the compositions on an injection molder. The resulting plaques were then tested in accordance with ASTM Standard D1003-92 using a BYK-Gardner Haze-Gard Plus to determine the percent haze for each of the polypropylene random copolymer compositions. The results for each of these measurements are set forth in Table 5 below.

TABLE 5

Haze measurements for Samples 2A-2C, Comparative Sample 3, and Comparative Sample 4.

| Sample | Haze (%) | Co-additive Amount (ppm) |
|---|---|---|
| Comparative Sample 4 | 8.93 | 0 |
| Comparative Sample 3 | 9.00 | 50 |
| Sample 2A | 8.12 | 200 |
| Sample 2B | 7.96 | 500 |
| Sample 2C | 8.07 | 1000 |

As can be seen from the results set forth in Table 5, the thermoplastic polymer compositions according to the invention (i.e., Samples 2A-2C) each exhibited lower haze values than the comparative samples (i.e., Comparative Samples 3 and 4). These results suggest that the additive compositions of the invention can be used to produce thermoplastic compositions having improved optical properties (e.g., haze values) relative to thermoplastic compositions containing the same amount of acetal compound or can be used to reduce the amount of acetal compound required to produce a thermoplastic compositions exhibiting the desired optical properties.

EXAMPLE 3

This example demonstrates the production of thermoplastic compositions according to the invention and some of the physical properties exhibited by thermoplastic articles made from such compositions. Sixteen polypropylene random copolymer compositions (Samples 3A-3L and Comparative Samples 5-8) were compounded in accordance with the general formulations set forth in Table 6 below and the general procedure described below.

TABLE 6

General formulation for Samples 3A-3L and Comparative Samples 5-8.

| Component | Amount |
|---|---|
| Polypropylene random copolymer | 1000 g |
| Primary antioxidant (Irganox ® 1010) | 0.5 g |
| Secondary antioxidant (Irgafos ® 168) | 1.0 g |
| Acid scavenger (calcium stearate) | 0.8 g |
| Acetal compound | as noted in Table 7 |
| Co-additive | as noted in Table 7 |

The acetal compound used in each of the compositions (i.e., Samples 3A-3L and Comparative Samples 5-8) was an acetal compound conforming to the structure of Formula (I) in which $R_1$ is an n-propyl group, $R_2$, $R_3$, $R_5$, $R_6$, $R_7$, $R_8$, $R_{10}$, and $R_{11}$ are each hydrogen, $R_{12}$ is —CHOHCH$_2$OH, and $R_4$ and $R_9$ are each n-propyl groups. Samples 3A-3L each contained diglycerol monomyristate, which is a fatty acid ester compound. The amount of the acetal compound and diglycerol monomyristate contained in each composition is noted in Table 7 below.

All sixteen of the polypropylene random copolymer compositions were compounded by blending the components in a high intensity mixer. The polypropylene random copolymer compositions were then melt compounded on a twin-screw extruder. The extrudate (in the form of a strand) for each polypropylene random copolymer composition was cooled in a water bath and subsequently pelletized.

The pelletized polypropylene random copolymer compositions were then used to form plaques by injection molding the compositions on an injection molder. The resulting plaques were then tested in accordance with ASTM Standard D1003-92 using a BYK-Gardner Haze-Gard Plus to determine the percent haze for each of the polypropylene random copolymer compositions. The results for each of these measurements are set forth in Table 7 below.

TABLE 7

Amounts of acetal compound and co-additive and haze measurements for Samples 3A-3L and Comparative Samples 5-8 ("C.S. 5-8").

| Sample | Acetal loading (ppm) | Co-additive loading (ppm) | Haze (%) |
|---|---|---|---|
| C.S. 5 | 2000 | 0 | 29.2 |
| Sample 3A | 2000 | 400 | 25.3 |
| Sample 3B | 2000 | 670 | 23.3 |
| Sample 3C | 2000 | 1000 | 22.1 |
| C.S. 6 | 3000 | 0 | 14.5 |
| Sample 3D | 3000 | 500 | 14.6 |
| Sample 3E | 3000 | 1000 | 13.8 |
| Sample 3F | 3000 | 1500 | 13.9 |

TABLE 7-continued

Amounts of acetal compound and co-additive and haze measurements for Samples 3A-3L and Comparative Samples 5-8 ("C.S. 5-8").

| Sample | Acetal loading (ppm) | Co-additive loading (ppm) | Haze (%) |
|---|---|---|---|
| C.S. 7 | 4000 | 0 | 12.2 |
| Sample 3G | 4000 | 1000 | 12.1 |
| Sample 3H | 4000 | 1500 | 12.3 |
| Sample 3I | 4000 | 2000 | 12.5 |
| C.S. 8 | 5000 | 0 | 12.0 |
| Sample 3J | 5000 | 1500 | 11.8 |
| Sample 3K | 5000 | 2500 | 12.6 |
| Sample 3L | 5000 | 3000 | 12.9 |

As can be seen from the results set forth in Table 7, several of the thermoplastic polymer compositions according to the invention (i.e., Samples 3A-3L) exhibited lower haze values than the comparative samples (i.e., Comparative Samples 5-8). These results suggest that the additive compositions of the invention can be used to produce thermoplastic compositions having improved optical properties (e.g., haze values) relative to thermoplastic compositions containing the same amount of acetal compound or can be used to reduce the amount of acetal compound required to produce a thermoplastic compositions exhibiting the desired optical properties.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A thermoplastic additive composition comprising:
    (a) an acetal compound conforming to the structure of Formula (II)

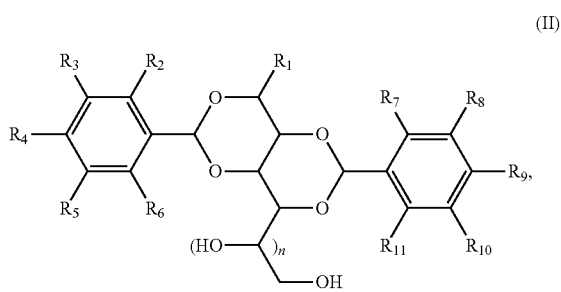

wherein n is 0, 1, or 2; $R_1$ is selected from the group consisting of alkyl groups, alkenyl groups, alkoxy groups, and alkyl halide groups; and $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkenyl groups, alkoxy groups, carboxyl groups, halogens, and phenyl groups; and
    (b) a fatty acid ester compound, wherein the fatty acid ester compound is the product of the reaction between a $C_{10}$-$C_{22}$ fatty acid and a compound selected from the group consisting of glycerol and diglycerol and the fatty acid ester compound comprises about 80 wt. % or more monoester, based on the total weight of the fatty acid ester compound present in the additive composition,
    wherein the acetal compound comprises about 60 to about 90 wt. % of the additive composition and the fatty acid ester compound comprises about 10 to about 40 wt. % of the additivie composition, based on the total weight of the acetal compound and fatty acid ester compound present in the additive composition.

2. The additive composition of claim 1, wherein $R_1$ is an alkyl group.

3. The additive composition of claim 2, wherein $R_1$ is an n-propyl group.

4. The additive composition of claim 3, wherein n is 1; $R_4$ and $R_9$ are alkyl groups; and $R_2$, $R_4$, $R_5$, $R_6$, $R_7$, $R_9$, $R_{10}$, and $R_{11}$ are each hydrogen.

5. The additive composition of claim 4, wherein $R_4$ and $R_9$ are n-propyl groups.

6. The additive composition of claim 1, wherein the fatty acid ester compound is the product of the reaction between a $C_{12}$-$C_{18}$ fatty acid and diglycerol.

7. The additive composition of claim 6, wherein the fatty acid ester compound is selected from the group consisting of diglycerol monolaurate, diglycerol monomyristate, diglycerol monostearate, and combinations thereof.

8. A polyolefin composition comprising a polyolefin and the additive composition of any one of claims 1-5,6, and 7.

9. The polyolefin composition of claim 8, wherein the acetal compound is present in an amount of about 1,000 to about 10,000 ppm, based on the total weight of the polyolefin composition.

10. The polyolefin composition of claim 9, wherein the fatty acid ester compound is present in an amount of about 100 to about 5,000 ppm, based on the total weight of the polyolefin composition.

11. The polyolefin composition of claim 8, wherein the polyolefin composition comprises polypropylene.

* * * * *